July 3, 1928.

L. A. WILKIE

FLOWERPOT HOLDER

Filed May 18, 1927

1,676,124

INVENTOR
L. A. Wilkie
BY
E. J. Fetherstonhaugh
& Son.

Patented July 3, 1928.

1,676,124

UNITED STATES PATENT OFFICE.

LORNE ARTHUR WILKIE, OF WINDSOR, ONTARIO, CANADA.

FLOWERPOT HOLDER.

Application filed May 18, 1927. Serial No. 192,276.

This invention relates to a flower pot holder as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to furnish means for holding flower pots and the like from window sills, verandas and balconies; to keep the sills free and at the same time allow the flower pots to be supported thereby but projecting therebeyond; to increase the attractiveness of the home and keep the flower pots in a neat position on their holder; and generally, to provide a holder of comparatively few and simple parts, cheap to manufacture and durable in construction.

In the drawings, Figure 1 is a side view of the flower pot holder;

Like numerals of reference indicate corresponding parts in the various figures.

Figure 1:
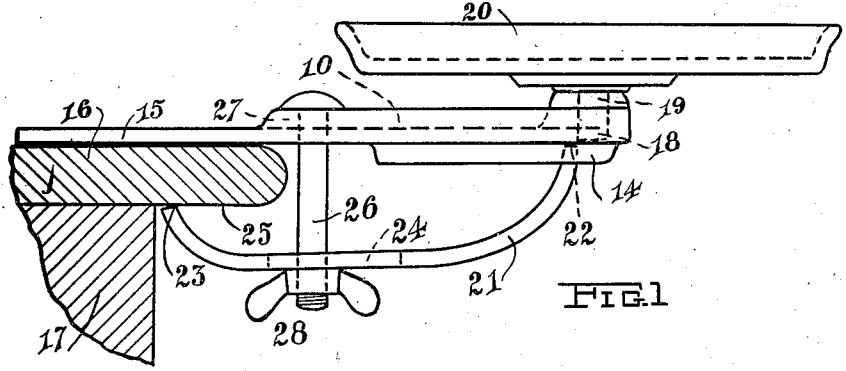

Referring to the drawings, the flower pot holder is formed of an elongated plate 10 having the guide flanges 13 and 14 thereunder. One end 15 of the plate 10 forms a resting member on a sill 16 of the window 17 while the other end terminates in a pivoting bearing member 18. A pivoting rod 19 projects therefrom and engages and supports the flower pot container 20 which is formed of any suitable shape or size.

The clamp 21, which is made in the form of a resilient bar having the end flanges 22 and 23 and the elongated slot 24, is adapted to have one end engage with the guide flanges 13 and 14 of the plate 10 and the other end engaging the underside of the sill at 25.

The bolt 26 passing through the slot 24 and bolt hole 27 in the plate 10 connects the clamp 21 with the plate 10 and is tightened by the butterfly nut 28.

Figure 2:
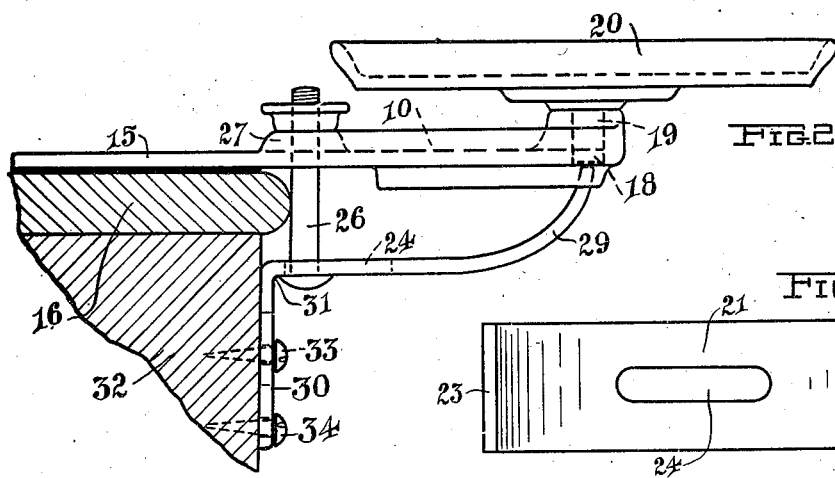
Figure 2 is a modified form of the flower pot holder.
Figure 4:
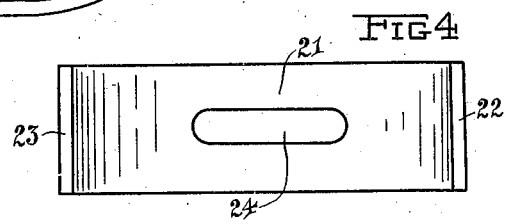
Figure 4 is a plan view of the resilient clamp as shown in Figure 1.
Figure 3:
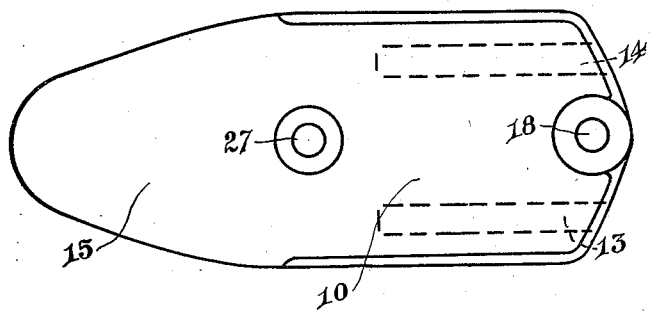
Figure 3 is a plan view of the main bearing plate.
Figure 5:
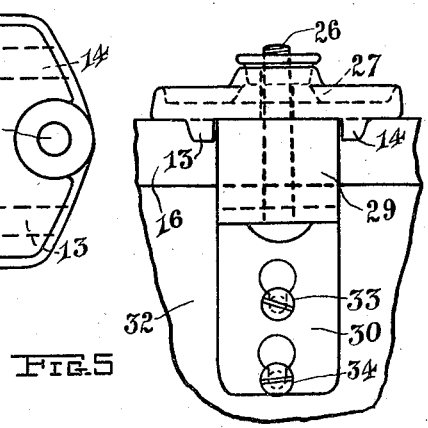
Figure 5 is an end view of the resilient clamp applied to the window sill.

The form shown in Figure 2 is for a window sill that has little or no projection and the difference in this construction to the other form is that the spring clamp 29 having one end engaging the flanges 13 and 14 of the plate 10, has the other end 30 bent downwardly at 31 and secured to the lower frame work 32 of the window sill 16 by screws 33 and 34.

In the use of this invention the flower pot holder is clamped on or secured to the window sill as described and the flower pot is placed in the container which is in the form of a turn table and pivoted.

The parts of the holder are preferably made of metal, although wood or other structures may be used.

What I claim is:

1. A flower pot holder comprising a main plate adapted to be supported on a sill at one end and its other end forming supporting means for a turntable, said main plate having at its outer end and on its under side guide members, and a resilient bar having a slot therein and flanges at each end adapted to engage with said guide members at one end and adapted to engage on the under side of the sill at the other end, and a bolt and locking means passing through the elongated slot of said resilient bar and engaging through a bolt hole of said main plate and adapted to be secured.

2. A flower pot holder comprising an elongated metal plate having its elongated end supported on a sill and its other end projecting therebeyond and having a bearing member containing a pivoted rod forming a support for a turntable, said metal plate having towards its outer end and on its under end guide members, a resilient clamp having one end adapted to engage said guide members and its inner end bent inwardly at right angles to said window sill adapted to be secured to the under framework thereof, and means passing through said resilient clamp and said metal plate for securing the two together.

Signed at the city of Windsor, this 29th day of April, 1927.

LORNE ARTHUR WILKIE.